(12) United States Patent
Rajagopal et al.

(10) Patent No.: US 10,828,687 B2
(45) Date of Patent: Nov. 10, 2020

(54) STRUT AND METHOD OF FORMING STRUT

(71) Applicant: GE Aviation Systems Limited, Gloucestershire (GB)

(72) Inventors: Sridhar Rajagopal, Karnataka (IN); Sagar Paramashivaiah, Karnataka (IN); Merin Sebastian, Karnataka (IN); Sandeep Kumar, Karnataka (IN); Dattu GuruVenkata Jonnalagadda, Karnataka (IN)

(73) Assignee: GE Aviation Systems Limited, Cheltenham (GB)

( * ) Notice: Subject to any disclaimer, the term of this patent is extended or adjusted under 35 U.S.C. 154(b) by 200 days.

(21) Appl. No.: 16/112,827

(22) Filed: Aug. 27, 2018

(65) Prior Publication Data

US 2019/0091749 A1    Mar. 28, 2019

(30) Foreign Application Priority Data

Sep. 27, 2017    (GB) .................................. 1715614.2

(51) Int. Cl.
| | | |
|---|---|---|
| *C25D 1/02* | (2006.01) | |
| *B21D 22/28* | (2006.01) | |
| *F16B 37/04* | (2006.01) | |
| *B64D 27/26* | (2006.01) | |
| *B23K 31/02* | (2006.01) | |

(52) U.S. Cl.
CPC ............... *B21D 22/28* (2013.01); *C25D 1/02* (2013.01); *F16B 37/048* (2013.01); *B23K 31/02* (2013.01); *B64D 27/26* (2013.01); *B64D 2027/262* (2013.01)

(58) Field of Classification Search
CPC ......... B21D 22/28; F16B 37/048; C25D 1/02; C25D 1/00; B64D 2027/262; B64D 27/26; B64D 27/12; B23K 31/02; B23P 15/00
See application file for complete search history.

(56) References Cited

U.S. PATENT DOCUMENTS

| | | | |
|---|---|---|---|
| 1,599,349 A | 2/1926 | Robinson | |
| 2,613,178 A | 10/1952 | Grant | |
| 4,255,237 A | 3/1981 | Obert et al. | |
| 4,326,928 A | 4/1982 | Dugan | |
| 4,711,833 A * | 12/1987 | McAneney | B29C 41/006 |
| | | | 264/1.36 |

(Continued)

FOREIGN PATENT DOCUMENTS

| | | |
|---|---|---|
| CN | 102333690 A | 1/2012 |
| EP | 2657550 A1 | 10/2013 |

(Continued)

OTHER PUBLICATIONS

Great Britain Search Report and Written Opinion dated Mar. 19, 2018 which was issued in connection with patent application No. GB 1715614.2 which was filed on Sep. 27, 2017.

(Continued)

*Primary Examiner* — Lee A Holly
(74) *Attorney, Agent, or Firm* — McGarry Bair, P.C.

(57) ABSTRACT

A method of forming a strut includes providing a ring with a threaded section, coupling a mandrel to the ring, and electroforming a metallic layer over the mandrel and ring. The strut can include an integral monolithic body.

6 Claims, 5 Drawing Sheets

(56) References Cited

U.S. PATENT DOCUMENTS

| | | | | |
|---|---|---|---|---|
| 4,781,799 | A | * | 11/1988 | Herbert, Jr. .............. C25D 1/02 205/73 |
| 8,506,199 | B2 | | 8/2013 | Rump et al. |
| 2009/0306692 | A1 | * | 12/2009 | Barrington ......... A61B 17/3203 606/167 |
| 2011/0120872 | A1 | | 5/2011 | Oda et al. |
| 2015/0082847 | A1 | * | 3/2015 | Stewart .................... B21C 1/22 72/20.2 |
| 2015/0233586 | A1 | * | 8/2015 | Hill .......................... F23L 1/00 126/116 R |
| 2017/0198734 | A1 | * | 7/2017 | Bernard .................... F16B 7/02 |
| 2018/0085533 | A1 | * | 3/2018 | Trosborg ................. C25D 5/16 |

FOREIGN PATENT DOCUMENTS

| | | | |
|---|---|---|---|
| GB | 1061684 | A | 3/1967 |
| GB | 2127124 | A | 4/1984 |
| GB | 22446580 | A | 5/1992 |
| JP | H02118092 | A | 5/1990 |
| JP | H09505388 | A | 5/1997 |
| WO | 9514120 | | 5/1995 |

OTHER PUBLICATIONS

Chinese Patent Office, Office Action re Corresponding Application No. 201811125344.X, dated Apr. 15, 2020, 8 pages, China.
European Patent Office, European Search Report re Application No. 18194841.5-1103, dated Jan. 7, 2019, 11 pages, Munich, Germany.

* cited by examiner

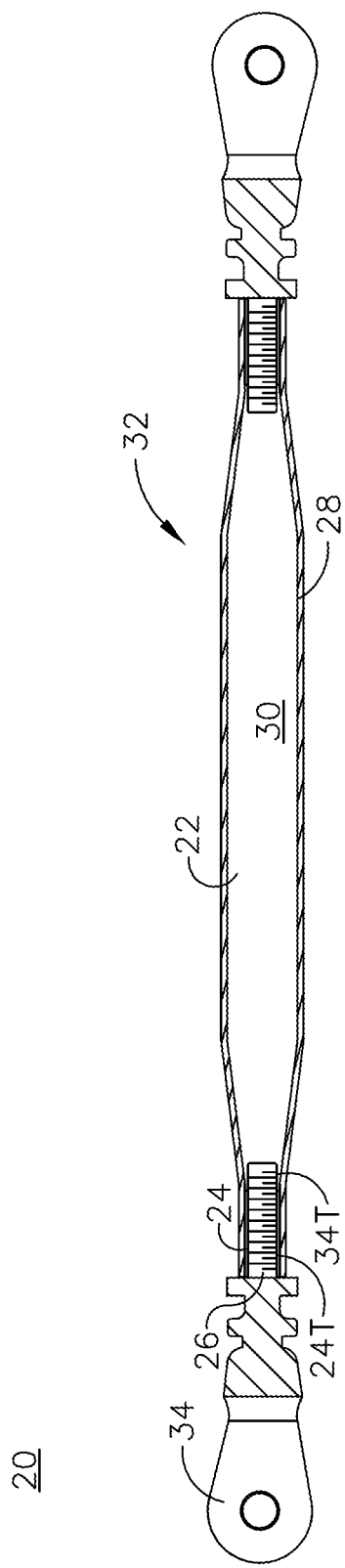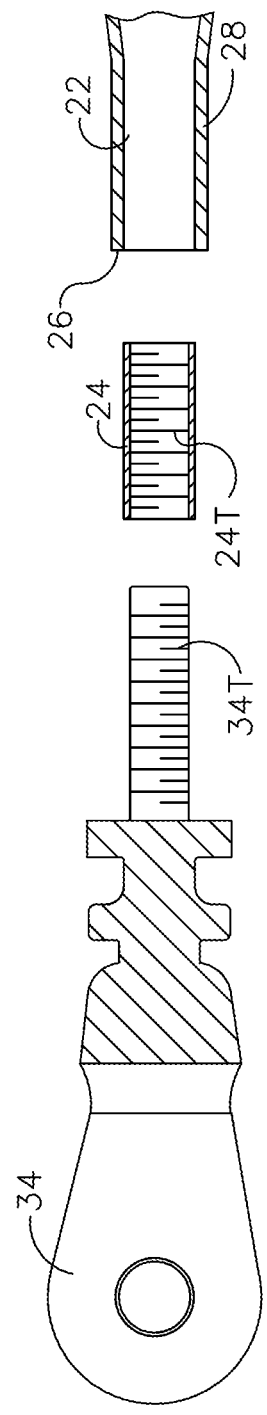
FIG. 2
FIG. 3

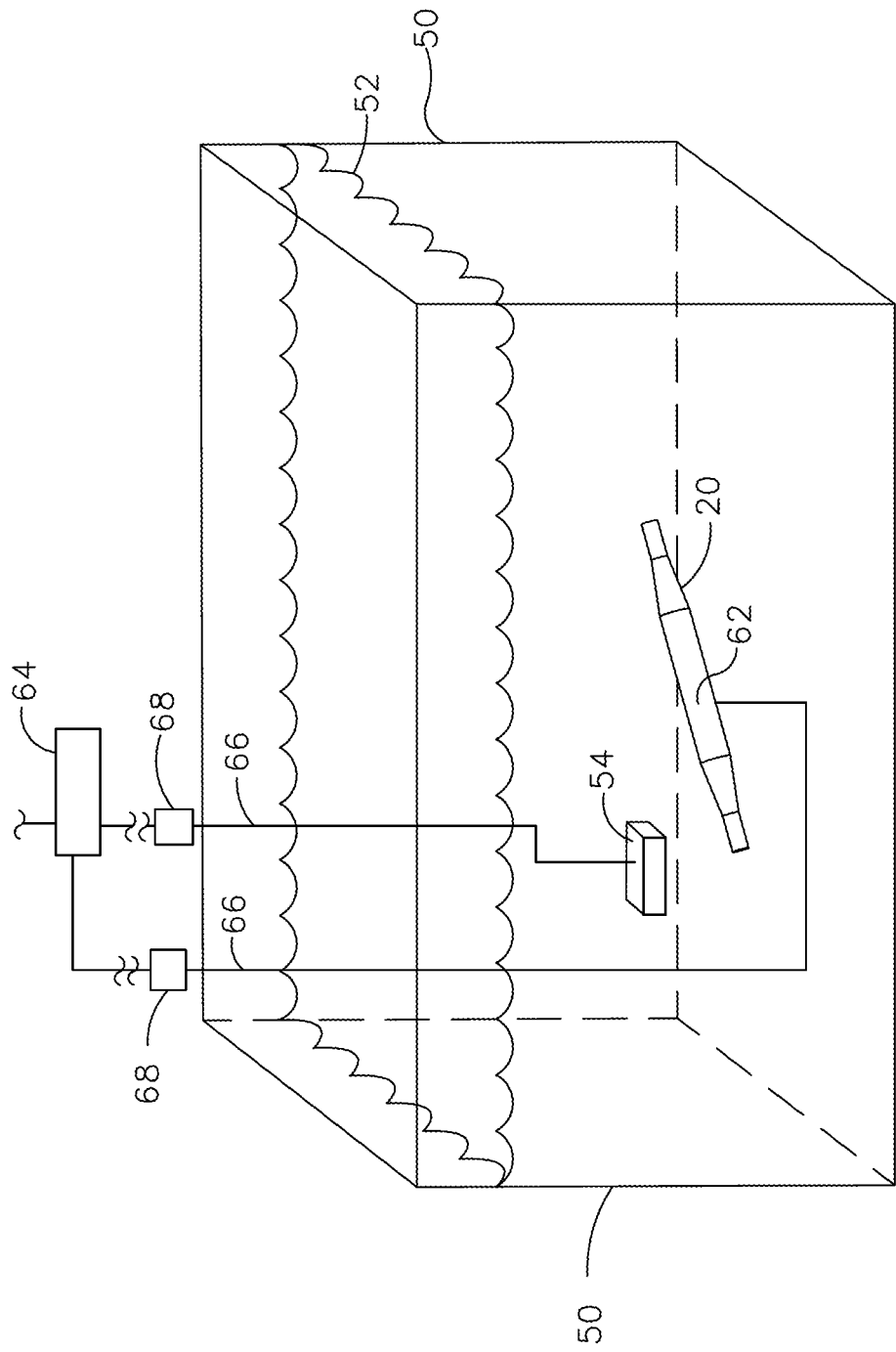

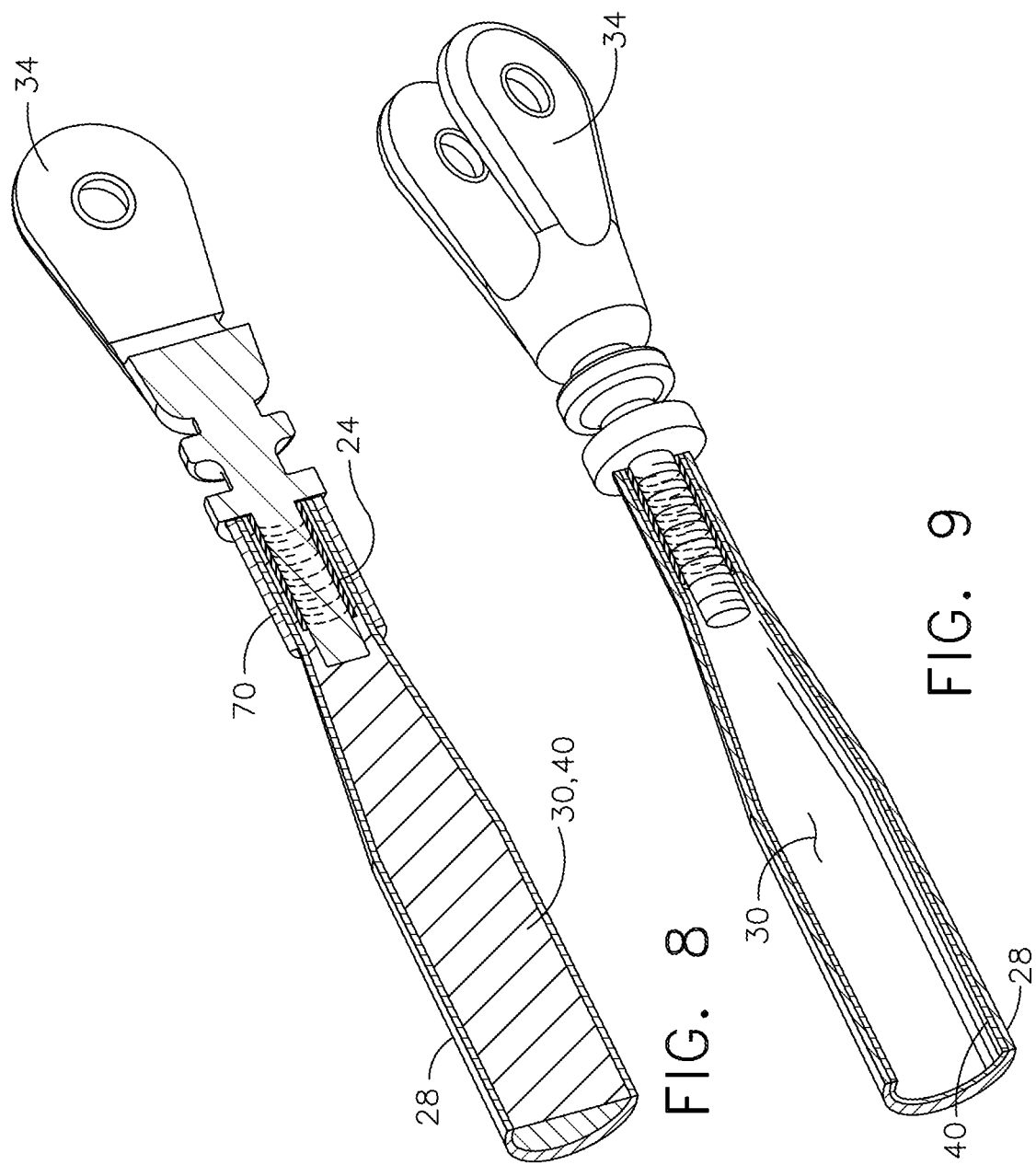

STRUT AND METHOD OF FORMING STRUT

BACKGROUND

Mechanical structures, such as chassis or frames, often experience forces that can cause components within the structure to shift in relative positioning. Struts are frequently used in such structures to support components against undesired tension, compression or stresses.

Aircraft components can experience a large range of forces or stresses across a range of temperatures in operation. It can be beneficial to form a strut capable of being used in a variety of environments, where features of the strut can be tailored to the desired environment in operation.

BRIEF DESCRIPTION

In one aspect, a method of forming a strut includes providing a ring having an internal threaded section, coupling a mandrel to the ring having the internal threaded section, electroforming a metallic layer over exposed surfaces of the ring having the internal threaded section and outer surfaces of the mandrel, and removing the mandrel to define the strut having an integral monolithic body with the internal threaded section.

In another aspect, a method of forming a strut includes providing a ring having an internal threaded section, coupling a metal mandrel to the ring having the internal threaded section, and electroforming a metallic layer over exposed surfaces of the ring having the internal threaded section and outer surfaces of the mandrel to define a strut rod having an integral monolithic body with the internal threaded section.

In yet another aspect, a strut assembly for an aircraft includes a strut core having a metallic integral monolithic body that includes a bar having at least one end with an internal threaded section.

BRIEF DESCRIPTION OF THE DRAWINGS

In the drawings:

FIG. 2 is a cross-sectional view of a strut assembly that can be utilized in the aircraft of FIG. 1.

FIG. 3 is an exploded view of an end of the strut assembly of FIG. 2.

FIG. 7 illustrates an electroforming bath for forming the strut assembly of FIG. 2.

FIG. 8 is a cross-sectional view of a strut assembly that can be utilized in the aircraft of FIG. 1.

FIG. 9 is a cross-sectional view of a strut assembly that can be utilized in the aircraft of FIG. 1.

DESCRIPTION OF EMBODIMENTS

Figure 1:
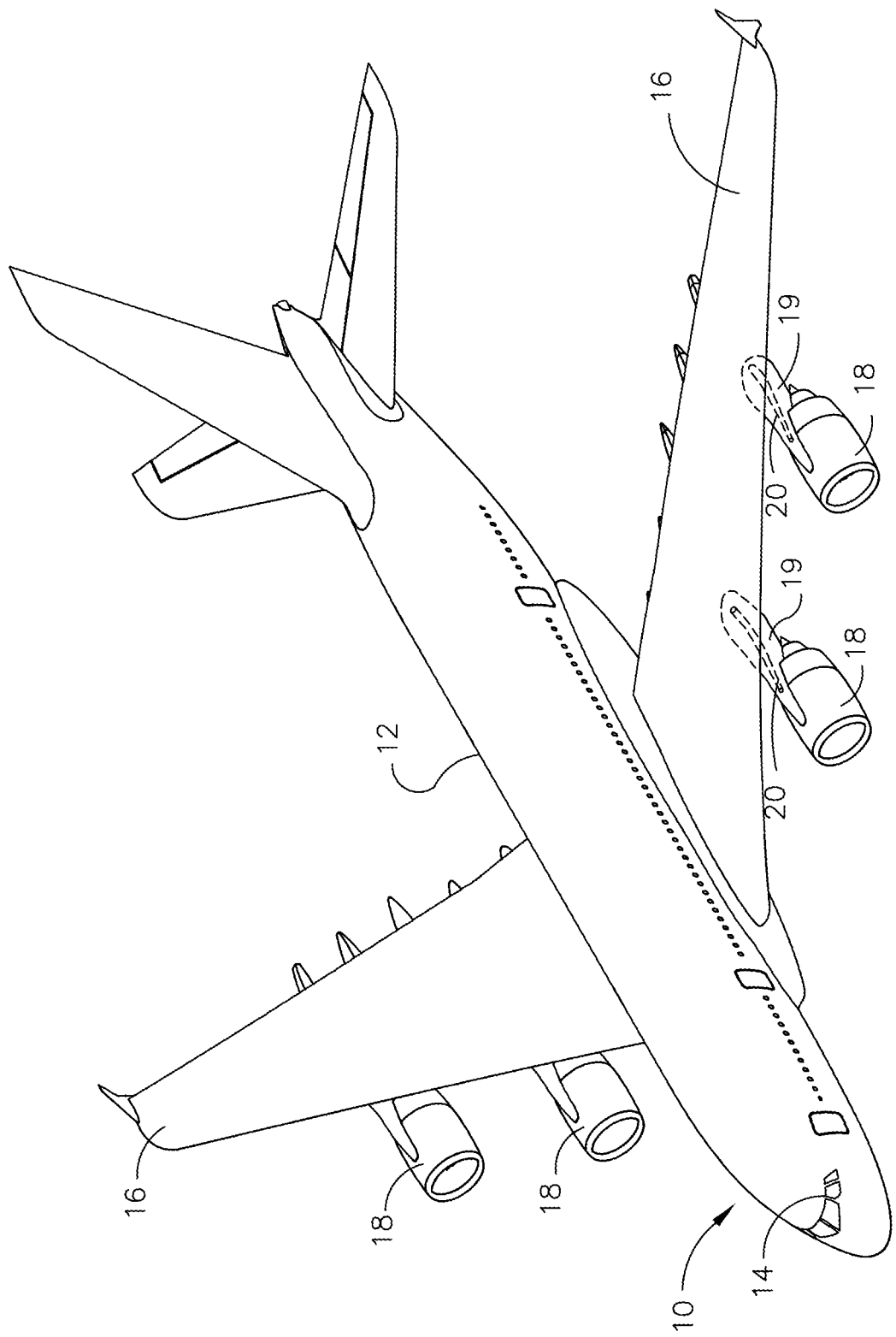
FIG. 1 is a schematic view of an aircraft having a strut in accordance with various aspects described herein.

The present disclosure is directed to a strut assembly. For purposes of illustration, the present disclosure will be described with respect to a strut within an aircraft engine pylon. It will be understood, however, that the present disclosure is not so limited and can have general applicability throughout the aircraft, as well as in non-aircraft applications or other commercial or residential applications.

As used herein "a set" can include any number of the respectively described elements, including only one element. Additionally, all directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the present disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 illustrates an aircraft 10, which can also include a fuselage 12, a cockpit 14 positioned in the fuselage 12, and wing assemblies 16 extending outward from the fuselage 12. The aircraft 10 can also include multiple engines, including turbine engines 18, which by way of non-limiting example can be turbojet engines, turbofan engines, or turboprop engines. While a commercial aircraft 10 has been illustrated, it is contemplated that aspects of the disclosure described herein can be used in any type of aircraft including helicopters or space shuttles. Further, while two turbine engines 18 have been illustrated on each of the wing assemblies 16, it will be understood that any number of turbine engines 18 can be included in the aircraft 10, including, but not limited to, a single turbine engine 18 on the wing assemblies 16 or fuselage 12, a single turbine engine 18 mounted in the fuselage 12 or the vertical tail, or a turbine engine 10 on each wing assembly 16 and another turbine engine 10 on the tail.

In the example of FIG. 1, the turbine engine 18 can be secured to the wing assembly 16 by way of an engine pylon 19. A strut assembly 20 can be mounted within the engine pylon 19 such that internal forces or stresses can be carried along the strut assembly 20 to support the structure of the aircraft 10. It will be understood that while illustrated within the engine pylon 19, the strut assembly 20 can be included anywhere within the aircraft 10, including within the turbine engine 18, as desired.

Turning to FIG. 2, the strut assembly 20 can include a rod or bar 22 with rings 24 having an internal threaded section 24T and integrally formed within distal ends 26 of the bar 22. The bar 22 can also include an outer metallic layer or metallic shell 28 and a strut core 30 that can be hollow or solid. Together the bar 22 and rings 24 can define an integral monolithic body 32 of the strut assembly 20. The strut assembly 20 can be formed from any suitable material for the desired environment such as aluminum, titanium, or steel, in non-limiting examples.

FIG. 3 more clearly illustrates that strut end fittings 34 having an external threaded section 34T can be attached to the rings 24 for attachment within a mechanical assembly such as the aircraft 10 of FIG. 1. The internal threaded section 24T of the ring 24 can couple to the external threaded section 34T on the end fitting 34 for secure attachment, and the outer metallic layer 28 can surround the ring 24 and threaded portion 34T of the end fitting 34.

Figure 4:
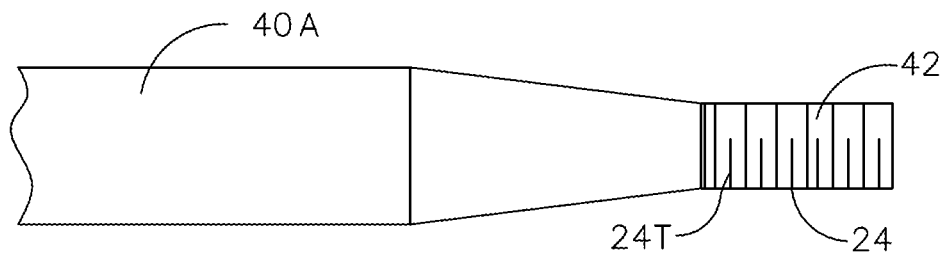
FIG. 4 illustrates a mandrel and ring used to form the strut assembly of FIG. 2.
Figure 5:
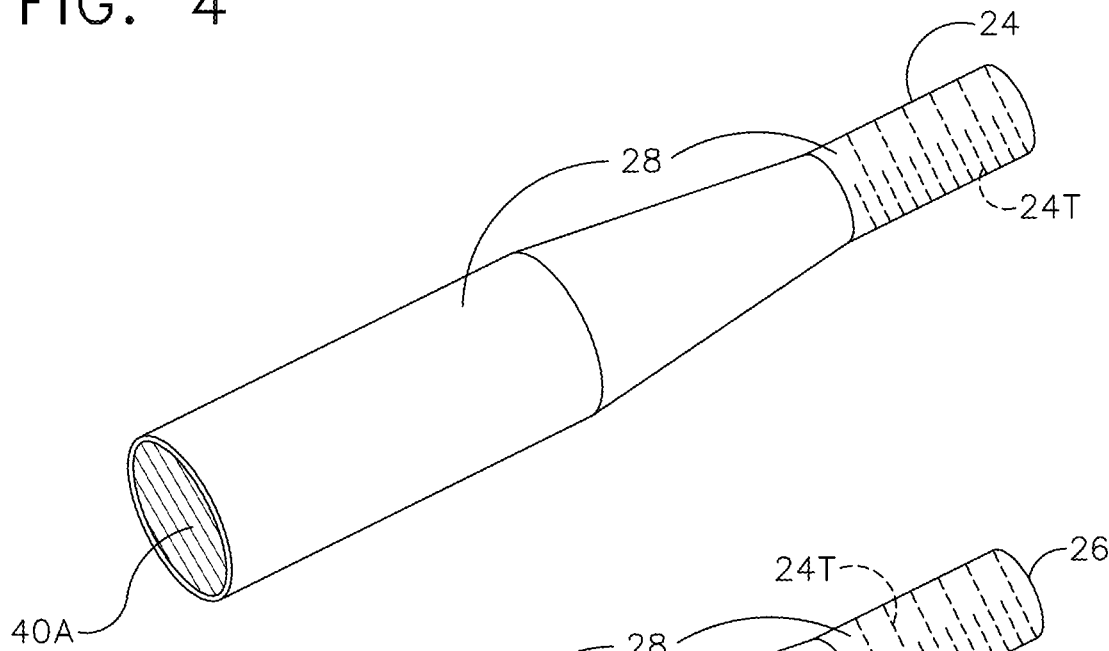
FIG. 5 illustrates an electroformed coating over elements of FIG. 4.
Figure 6:
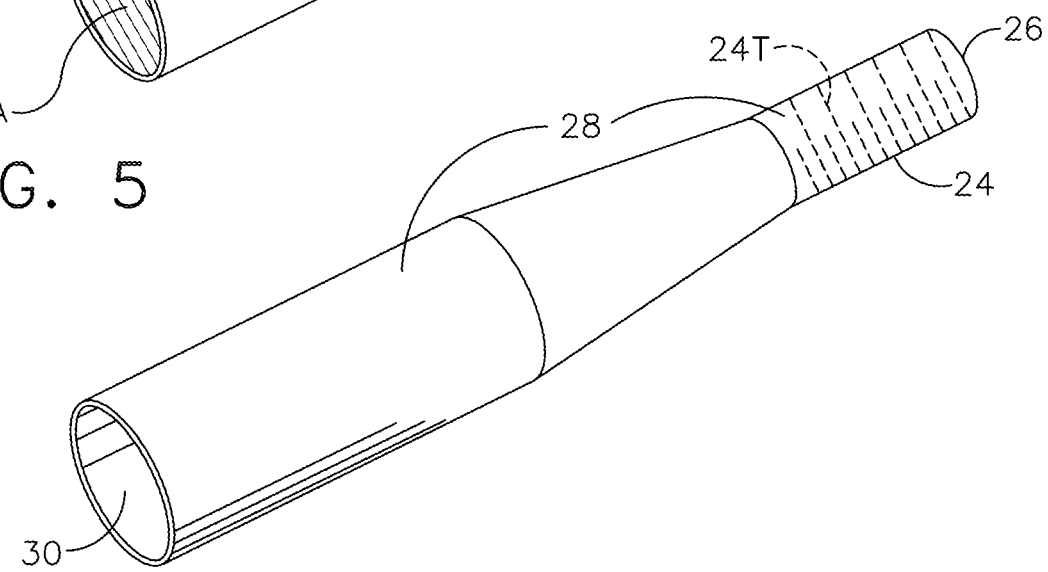
FIG. 6 illustrates the mandrel removed from that of FIG. 5.

Referring now to FIG. 4, a mandrel 40A is illustrated having mandrel ends 42 with a ring 24 placed around each mandrel end 42; it should be understood that one end 42 of the mandrel 40A is shown, and the description of one end 42 can apply to either or both ends 42. It is contemplated in a non-limiting example that the mandrel 40A can be molded from a sacrificial material such as wax or plastic material, for example by injection molding, where the mandrel 40A can be attached to the rings 24 during the molding process. The electroforming process can create the metallic layer 28 over the rings 24 and mandrel 40A as shown in FIG. 5, where all exposed surfaces of the rings 24 and mandrel 40A can be covered by the metallic layer 28. The mandrel 40A can then be removed by application of heat or a chemical flush in non-limiting examples. In this manner, the strut assembly 20 can be created with the metallic layer 28 forming a hollow strut core 30, and rings 24 with internal threading 24T disposed within the distal ends 26, as illustrated in FIG. 6.

The electroforming process is illustrated by way of an electrodeposition bath in FIG. 7. An exemplary bath tank 50 carries a single metal constituent solution 52. The single metal constituent solution 52, in one non-limiting example, can include aluminum alloy carrying manganese ions. In one alternative, non-limiting example, the single metal constituent solution 52 can include nickel alloy carrying alloying metal ions.

An anode 54 spaced from a cathode 62 is provided in the bath tank 50. The anodes 54 can be sacrificial anodes or an inert anode. While one anode is shown, it should be understood that the bath tank 50 can include any number of anodes 54 as desired. The strut assembly 20 can form the cathode 62, having electrically conductive material. It is also contemplated that a conductive spray or similar treatment can be provided to the strut assembly 20 to facilitate formation of the cathode 62. In addition, while illustrated as one cathode 62, it should be appreciated that one or more cathodes are contemplated for use in the bath tank 50.

A controller 64, which can include a power supply, can electrically couple to the anode 54 and the cathode 62 by electrical conduits 66 to form a circuit via the conductive metal constituent solution 52. Optionally, a switch 68 or sub-controller can be included along the electrical conduits 66, between the controller 64 and the anodes 54 and cathode 62. During operation, a current can be supplied from the anode 54 to the cathode 62 to electroform a monolithic body at the strut assembly 20. During supply of the current, aluminum and manganese from the single metal constituent solution 52 form a metallic layer, such as the metallic layer 28 described in FIG. 3, over the strut assembly 20 to form the monolithic body 32.

Turning to FIG. 8, it is also contemplated that the mandrel utilized for forming the strut assembly 20 can be a non-sacrificial component that remains within the strut assembly 20. In one example, a mandrel 40B can comprise a solid body that the metallic layer 28 is electroformed over along with the rings 24. In this manner the mandrel 40B, rings 24, and metallic layer 28 form a strut core 30 that is an integral monolithic body 32. The mandrel 40B by way of non-limiting example can include a solid, cold-drawn aluminum body. The rings 24 can be threaded into ends of the mandrel 40B as described above, or the rings 24 can also be coupled to the mandrel 40B by suitable methods such as welding.

It is further contemplated that an additional layer 70 can be deposited onto select areas of the metal layer 28, and is illustrated in the example of FIG. 8 as being deposited in registry with the rings 24 to provide additional support to the rings 24 against applied stresses in operation. It will be appreciated that the additional layer 70 can be applied over any selected region of the strut assembly 20 as desired.

FIG. 9 further illustrates that a hollow mandrel 40C can also be utilized, such that when the metallic layer 28 is electroformed over the mandrel 40C and rings 24, the resulting strut core 30 can be hollow. The hollow mandrel 40C can include a cold-drawn aluminum body. As in the example of FIG. 8, the rings 24 can be threaded or welded into ends of the hollow mandrel 40C to form the integral monolithic body 32.

The aspects of the disclosure described above provide for a variety of benefits including that the use of high strength material for electroforming, such as aluminum, can enhance load-carrying capabilities of the strut. The method of forming the strut integrally with the internally-threaded rings can eliminate the need for additional features for insertion of traditional locking rings.

In addition, the local deposition of material over regions experiencing locally higher stresses, such as the threaded regions at the rings where forces can be concentrated in operation, can allow for selective strengthening of regions along the strut thereby offering a weight-effective strut design. This can be done even if the strut itself is not a monolithic strut as described. The proposed methods can also enable deposition of tailor-made materials with improved properties such as yield strength or ultimate strength of the material when compared to the use of conventional materials and manufacturing methods.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a strut, comprising:
   providing a ring having an internal threaded section;
   coupling a hollow aluminum metal mandrel including a threaded section to the ring having the internal threaded section and an external threaded section wherein the coupling includes threading the hollow aluminum mandrel onto the external threaded section; and
   electroforming a metallic layer over exposed surfaces of the ring having the internal threaded section and outer surfaces of the mandrel to define a strut rod having an integral monolithic body with the internal threaded section.

2. The method of claim 1 wherein the coupling includes welding the hollow aluminum mandrel to the ring.

3. The method of claim 1 further comprising drawing a metal body to form the metal mandrel.

4. The method of claim 1, further comprising attaching a strut end fitting within the internal threaded section.

5. The method of claim 1, further comprising electroforming an additional layer over the metallic layer on the ring.

6. The method of claim 1 wherein two rings are provided and the metal mandrel is coupled between the two rings.

* * * * *